(12) United States Patent
Jäger

(10) Patent No.: US 7,179,026 B2
(45) Date of Patent: Feb. 20, 2007

(54) METHOD FOR PRODUCING A RIM AND A RIM, PARTICULARLY FOR A BICYCLE

(75) Inventor: Gerrit Jäger, Pery (CH)

(73) Assignee: DT Swiss Inc., Grand Junction, CO (US)

( * ) Notice: Subject to any disclaimer, the term of this patent is extended or adjusted under 35 U.S.C. 154(b) by 0 days.

(21) Appl. No.: 11/170,867

(22) Filed: Jun. 30, 2005

(65) Prior Publication Data

US 2005/0252003 A1    Nov. 17, 2005

Related U.S. Application Data

(62) Division of application No. 10/600,197, filed on Jun. 20, 2003, now Pat. No. 6,955,509.

(30) Foreign Application Priority Data

Jun. 20, 2002 (DE) ................ 102 27 574

(51) Int. Cl.
*B23C 1/00* (2006.01)
*B60B 21/06* (2006.01)
*B21K 1/38* (2006.01)

(52) U.S. Cl. ............ 409/132; 409/139; 409/192; 301/95.104; 29/894.35

(58) Field of Classification Search ............ 409/132, 409/139, 140, 192, 203, 213, 217; 29/894.35; 301/95.104, 95.106
See application file for complete search history.

(56) References Cited

U.S. PATENT DOCUMENTS 3,800,118 A    3/1974    Wefers et al.
4,585,046 A    4/1986    Buckley
5,651,591 A    7/1997    Mercat et al.
6,158,304 A    12/2000   Packer et al.
6,183,047 B1   2/2001    Kuhl
6,216,344 B1   4/2001    Mercat et al.
6,224,165 B1   5/2001    Mercat et al.
6,378,953 B2   4/2002    Mercat et al.

FOREIGN PATENT DOCUMENTS

| DE | 42 42 874 C1 | 11/1993 |
| DE | 93 20 953 U1 | 8/1995 |
| DE | 199 35 559 A1 | 2/2001 |
| DE | 200 20 624 U1 | 4/2001 |
| EP | 0 579 525 A1 | 1/1994 |
| JP | 6182629 A | 6/1994 |
| JP | 6182629 | 7/1994 |

*Primary Examiner*—Dana Ross
(74) *Attorney, Agent, or Firm*—Greer, Burns & Crain, Ltd.

(57) ABSTRACT

The invention relates to a rim and to a method for its production, in particular for bicycles, using a machining device for the working a welding burr of the rim. The machining device comprises a machining means working the outer contour of the rim and a another machining means working the inner contour of the rim, that has an outer diameter being less than the width of the rim well. The main steps of the method include movement of the first means along the outer contour of the rim to work the welding burr on the outer contour and movement of the second means along the inner contour of the rim to work the welding burr on the inner contour. During machining the inner contour the rim is pivoted around an axis by a predefined angular range.

1 Claim, 5 Drawing Sheets

METHOD FOR PRODUCING A RIM AND A RIM, PARTICULARLY FOR A BICYCLE

Figure 1:
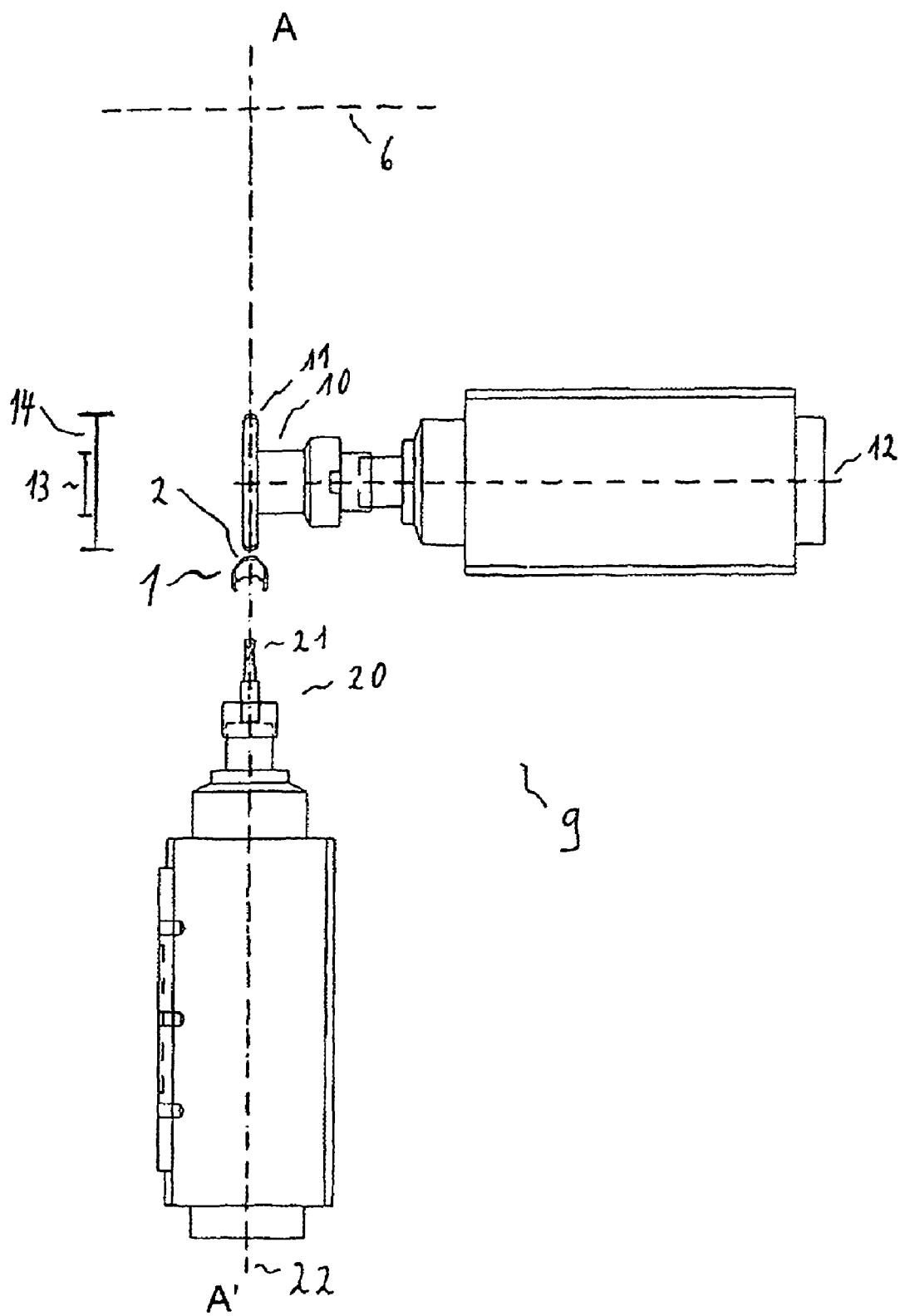

This is a divisional, of application Ser. No. 10/600,197, filed Jun. 20, 2003 now U.S. Pat. No. 6,955,509.

The invention relates to a rim and to a method for its production, the rim being particularly well-suited for use on bicycles.

The method can be employed not only for the production of rims and wheels for bicycles, but rather, the method according to the invention can likewise be used for the production of rims for other single-wheel or multiple-wheel vehicles such as, for example, (bicycle) trailers, baby carriages and strollers and for other wheels. For simplification purposes, the invention will be described below with reference to its use on bicycles, although this description should not be construed as a limitation of the scope of the application.

The running wheels of bicycles have a central hub and an outer rim with the tire. The hub is connected to the rim by a varying number of up to about 50 spokes.

In the sports, semiprofessional and professional sectors, high-quality materials are used for bicycles and light-weight as well as strong materials are employed so that usually light-weight metals such as aluminum and the like are used in the production of rims.

A rim includes rim flanges and a rim well situated between the rim flanges as well as a rim base which, in a finished wheel, is oriented radially towards the inside. The outer sides of the rims serve as braking surfaces. High-quality rims are usually designed as hollow chamber rims. Both bases of the rims then have holes that serve to receive the spoke nipples in the hollow space of the rim. The spoke nipple is accessible from the outside, for example, by means of a tool, through the radial outer hole. There are also rims without holes for use with tubeless tires.

Normally, the rims are U-shaped or V-shaped and have two lateral wings, namely, the rim flanges. The outer surfaces of the rim flanges form the braking surfaces while the bottom forms the rim well.

In the case of simple rims, the bottom of the rim well is the rim base while, in the case of hollow rims, a hollow space is provided between the rim well and the rim base in order to receive the spoke nipples and the like.

Typically, a rim is made of a bar section or the like, wherein a prescribed length is cut off and bent in a special bending device to form a circle. The abutting ends of the rim are joined to each other by means of a welding process such as, for example, percussion welding or flash-butt welding, or butt welding in general, in order to ensure a secure joining of the rim ends.

After the welding, on the outer contour, that is to say, also on the braking surfaces and on the rim base as well as on the inner contour (inside of the rim flanges and rim well), there is a welding burr that has to be removed in subsequent complex process steps in order to avoid sharp edges on the inside where contact is made with the tube or the tube tire, and in order not to hinder the braking on the outside, and also to ensure the strength of the rim in the rim well in the rim base.

In the state of the art, various methods and processes have become known for producing the rim and for machining the welding burr, such as those described, for instance, in German Utility Model DE 93 20 953 U1 on pages 1 to 15 and shown in FIGS. 1 to 10. The content of the utility model pertaining to the general production method for rims is thus incorporated in terms of its content into the disclosure of the present application.

The drawback of the methods known from the state of the art for producing a rim or removing a welding burr from a rim, however, is the large number of work steps required. Thus, for example, in German Utility Model DE 93 20 953 U1, a welding bead is removed in a first step before the first outer side is freed of the welding burr in a second step and the second outer side is freed of the welding burr in a third step. Afterwards, the rim well is worked with a milling cutter. Subsequently, the milled surfaces have to be deburred so as to remove sharp milling edges.

The invention is therefore based on the objective of providing a rim and a method for its production in which the machining of the welding burr requires fewer work steps.

The present invention proposes a rim and a method for its production, in which rims produced with the method according to the invention are intended particularly for use on bicycles.

The method according to the invention is carried out using a machining device that serves to work a welding burr of the contact surface of a rim. For this purpose, the machining device comprises a first machining means that works essentially the outer contour of the rim.

Furthermore, the machining device comprises a second machining means that works essentially the inner contour or rather the welding burr essentially on the inner contour of the rim. The second machining means has an outer diameter that is smaller than the width of the rim well.

First of all, the method according to the invention comprises the step of moving the first machining means essentially in the plane of the contact surface of the rim along the outer contour in order to work the outer contour or in order to grind down or remove the welding burr on the outer contour, and secondly, it comprises the step of moving the second machining means essentially in the plane of the contact surface of the rim along the inner contour in order to work the inner contour or to grind down or remove the welding burr on the inner contour.

The sequence of the working of the inner and outer contour can be freely chosen as desired.

During the working of the inner contour, the rim is pivoted by a predefined angular range around an axis and preferably around the central rim axis, the rim preferably being pivoted continuously back and forth within the angular range. Preferably, the second machining means is oriented essentially perpendicular to the rim plane.

This has the advantage that, with the second machining means, in spite of the small working diameter, an enlarged area on the rim is worked since, due to the pivoting back and forth of the rim, the machining means passes over a larger surface area.

In this manner, it is possible to use a second machining means that has a smaller outer diameter. Therefore, the outer diameter of the second machining means can be selected, for example, within a smaller range, 10 mm (or 15 mm), since the pivoting around a suitable angular range, which is adapted to the working diameter of the second machining means, allows a reliable and effective removal of the welding burr on the inner contour of the rim.

Moreover, by pivoting the rim, the effect can be achieved that burr-free transitions are created all the way from the working zone to the remaining rim well or to the rim edges.

At this juncture, it should be pointed out that the term inner contour of the rim refers to the area of the rim well and of the rim flanges extending to the outer sides of the ends of the rim flanges, while the term outer contour refers to the braking surfaces and to the base of the rim.

It is preferred for the angular range by which the rim is pivoted to be smaller than 10°, particularly preferably smaller than 5°. Preferably, the pivotable angular range is adapted to the diameter of the second machining means so as to obtain a working zone having a width of about 3 mm to 20 mm on the circumference around the rim. Likewise preferred are angular ranges of pivoting of ±0.25°, ±0.5° and ±1°.

The method according to the invention entails many advantages.

With the method according to the invention, after the bending and welding of the two rim ends, it is possible to produce a rim with fewer work steps since the welding burr can be removed effectively in fewer steps.

Preferably, during the entire working with the first machining means, a rotational axis of the first machining means is preferably essentially parallel to a central symmetry axis or axis of the rim through which the wheel axis runs.

This embodiment of the invention is very advantageous since the rotational axis of the first machining means is parallel to the (symmetry) axis of the rim, thus creating an additional contact area for the working diameter area of the first machining means on the outer area (rim well, etc.) of the rim. This results in a groove in the rim base and moreover, no sharp edges are formed during the working since the edge areas of the depression make a flat and continuous transition to the rest of the rim well without sharp edges.

On the other hand, if a machining means is used whose rotational axis lies in the rim plane, then in general, sharp transitions are formed from the worked site to the rest of the rim well, and these then require further after-treatment of the sharp edges.

Consequently, when the first machining means has a large outer diameter, the welding burr can be worked in a particularly efficient manner.

In an embodiment of the method, the first machining means has a working diameter area that is radially enlarged in such a way that essentially the entire outer contour of the rim can be worked without a need for repositioning.

It is then possible to gently remove the welding burr from both of the braking surfaces and from the rim base in one continuous work step. Thanks to the large diameter, a gentle transition is made from the worked zone to the unworked zone.

In a preferred embodiment of the invention, a disk milling cutter is used as the first machining means, and here the cutting surfaces of the disk milling cutter preferably act radially towards the outside as well as on the axial sides of the disk milling cutter.

Particular preference is given to an outer diameter of the disk milling cutter in the range between 50 mm and 200 mm, the diameter in the range between 60 mm and 150 mm being particularly preferred. Other diameters are also possible so as to achieve the outcome according to the invention.

In another preferred embodiment of one or more of the above-described embodiments of the method according to the invention, an end milling cutter is used as the second machining means. Particularly preferably, near the working head, which is preferably provided at one end of the end milling cutter, there is an undercut or a notch or a groove in the end milling cutter or in the second machining means, so that one work step is sufficient to work the side surfaces of the rim flanges and the outer ends of the rim flanges which are facing each other.

In a preferred embodiment of the invention, at least one machining means, that is to say, at least the first and/or the second machining means, comprises at least one cutting means that is selected from a group of cutting means comprising carbide cutting means and diamond cutting means as well as cutting plate means such as carbide cutting plates and diamond plates and the like.

The use of separate and preferably exchangeable cutting means on the machining means is very advantageous due to the fact that their employment enhances the usefulness of the machining means since the versatility can be improved by simply replacing the cutting means.

In a preferred embodiment of the method according to the invention, the process step of removing the welding burr on the outer contour and the process step of removing the weld seam on the inner contour are carried out essentially simultaneously or at least partially simultaneously, as a result of which that the overall working time is short.

In another preferred embodiment of the method according to the invention, the process steps of working the welding burr on the inner contour and of working the welding burr on the outer contour are carried out essentially consecutively.

Carrying out the individual process steps consecutively has the advantage that, without pivoting the rim, fewer contact zones are formed on the outer contour than is the case with identical tools when the rim is pivoted.

On the other hand, the tool or the dimensions of the tool of the first machining means can also be adapted to the pivoting range of the rim so that, even when the individual process steps are carried out simultaneously, essentially identical working zones are formed on the outer contour.

However, in order to achieve greater flexibility, in spite of the fact that the individual components can be adapted to each other, the process steps can also be carried out consecutively.

The rim according to the invention is particularly well-suited for use in a bicycle and comprises at least one rim base, one rim well and two rim flanges.

In the area of the weld seam, there is a flat depression on the rim base along a segment of the circumference, said flat depression in the rim base having the shape of a segment of a circle in at least one place in the circumferential direction. Preferably, the mid-point axis of this segment of a circle is essentially parallel to a central axis or symmetry axis or rotational axis of the rim.

Such a rim is very advantageous since a weld seam worked in this manner imparts high strength to the weld seam and thus to the entire rim.

Through the flat shape of the depression, a gentle transition with a diminished notch effect is achieved at the site of the weld seam so that sharp edges are avoided and thus the risk of the rim breaking at the weld seam is reduced.

In a preferred embodiment of the rim according to the invention, the inner and/or the outer contour is produced and worked according to at least one of the above-described methods according to the invention.

Additional advantages and application possibilities of the present invention ensue from the following examples of embodiments, which are described with reference to the figures.

Figure 2:
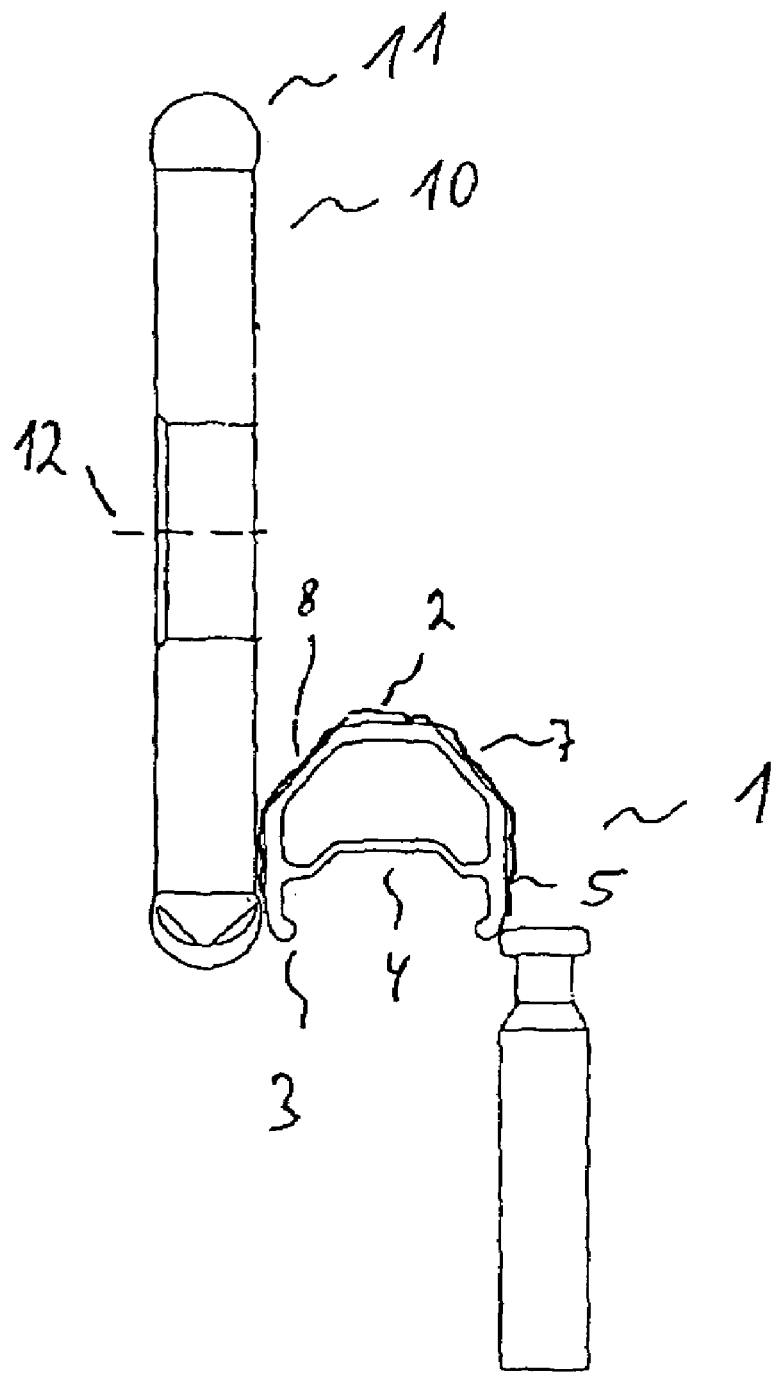
Figure 3:
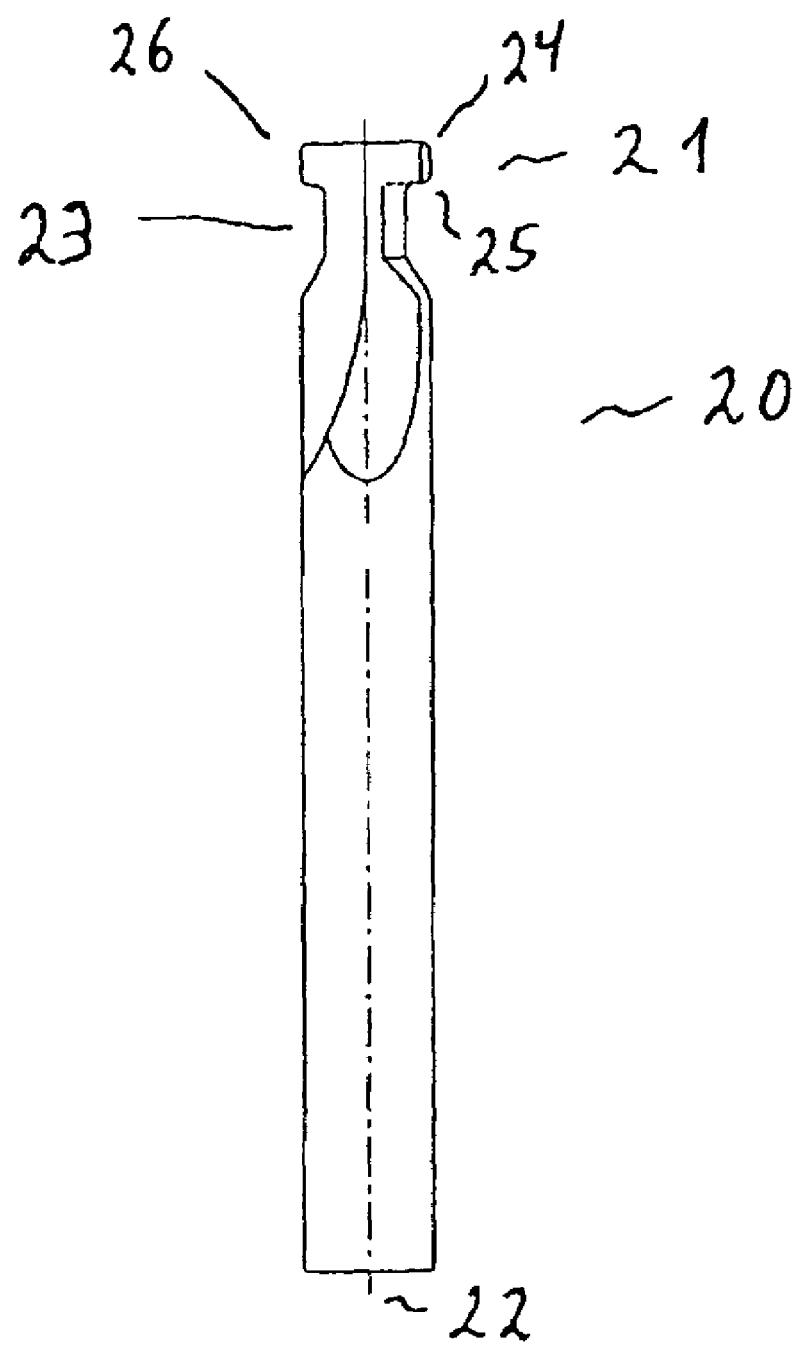
Figure 4:
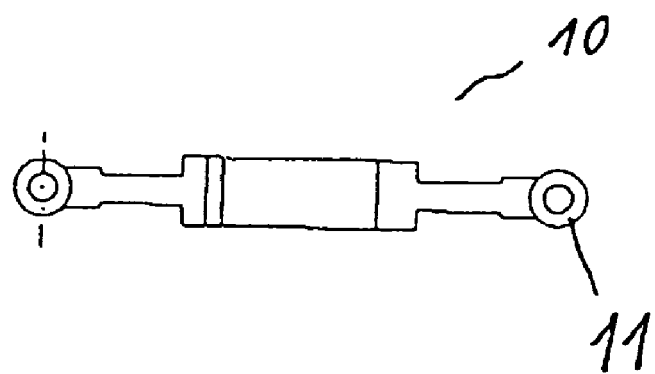
Figure 5:
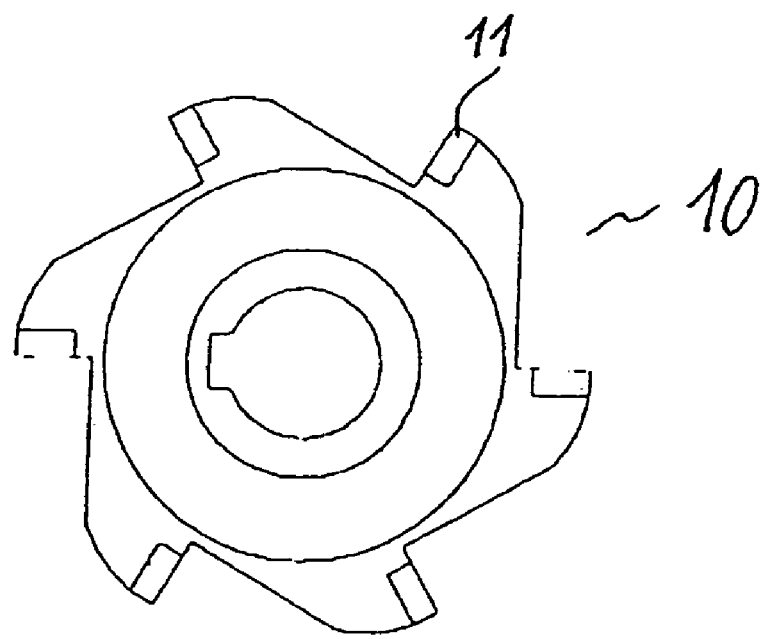

The figures show the following:

FIG. 1 a sectional view of the rim according to the invention during working;

FIG. 2 a schematic depiction of the rim and cutting tools according to FIG. 1;

FIG. 3 the end milling cutter of the machine of FIG. 1;

FIG. 4 the disk milling cutter of the machine of FIG. 1 in a side view;

FIG. 5 the disk milling cutter of the machine according to FIG. 1 in a top view.

Figure 6:
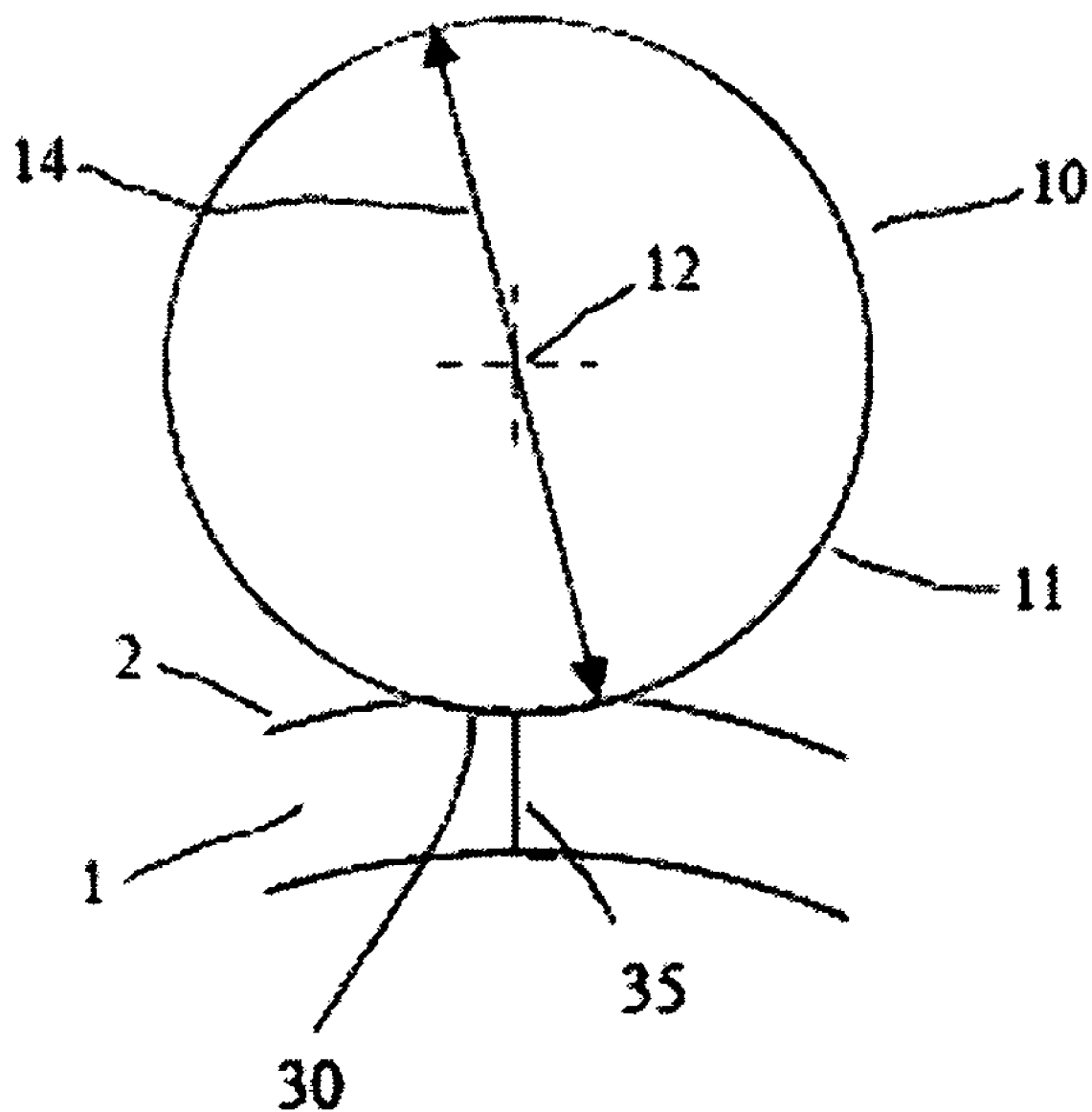

FIG. 6 is a cross-sectional view along the line A–A$_1$ in FIG. 1.

An embodiment of the invention will now be described with reference being made to the figures.

The machining means 10 and 20 of the machine 9 shown in FIG. 1 for working the welding burr on a rim are shown.

The first machining means 10 is configured in the embodiment as a disk milling cutter and comprises a motor and a drive shaft which has a diameter 13 in an area that is adjacent to the head of the disk milling cutter. The head of the disk milling cutter 10 itself has an outer diameter 14 in the area of the cutting surfaces 11.

The diameters 13 and 14 are coordinated with each other in such a way that the difference between diameter 14 and diameter 13 divided by 2 is greater than the height of the rim, as is also shown in FIG. 2.

In this way, the disk milling cutter 10 (see FIG. 2) can reach behind the rim in order to work the rear surface or the braking surface of the rim 1 (as seen from the direction of the disk milling cutter 10).

The disk milling cutter 10 used as the first machining means serves to work the welding burr 8 on the outer contour of the rim 1, namely, on the rim base 2, including the slanted side surfaces 7 and the braking surfaces 5 on both sides of the rim.

Since the diameters 13 and 14, as described above, are selected in such a way that the disk milling cutter 10 can also work the rear braking surface, the disk milling cutter 10 can essentially remove the welding burr from the entire outer contour of the rim 1 in one work step without a need for repositioning.

The disk milling cutter 10 is rotated around an axis 12 which, in the embodiment, is essentially parallel to the central symmetry axis or axis 6 of the rim 1. Thanks to this arrangement, shifting or traversing the disk milling cutter 10 in the page plane of FIGS. 1 and 2 along a rectangular coordinate system is sufficient to remove the welding burr from the outer contour of the rim 1. It is not necessary to pivot the disk milling cutter 10 in or opposite to the drawing plane.

Due to the large outer diameter 14 which, in the embodiment, is in the range of about 100 mm, an optimal removal of the welding burr 8 is performed particularly on the side surfaces 7 and on the lower rim base 2 of the rim 1. In the rim base 2, in the area of the weld seam 35, a shallow groove 30 is created which has no sharp edges towards the rest of the rim 1. In the depiction of FIG. 2, the welding burr on the inner contour has already been removed.

As shown in FIG. 6, in this context, the contour of the shallow groove 30 has the shape of a segment of a circle whose radius is 100 mm here. The mid-point during the working is the axis 12 of the disk milling cutter 10. From the central area of the shallow groove 30, this depression rises slightly and makes a steady and flat transition to the rest of the rim, so that, even at the transition site from the milled welding burr to the rim, there are no sharp edges whatsoever.

Moreover, the machine 9 has a second machining means configured as an end milling cutter 20 and having the cutting surfaces 21.

The end milling cutter 20 is shown in an enlarged depiction in FIG. 3. The cutting surfaces 21 are arranged at the milling head 26, and the cutting surfaces 21 have a cutting effect, particularly also in the area of the radii 24 and 25 on the milling head 26.

A groove 23 near the milling head 26 allows undercutting of the rim flanges 3 on the inner contour of the rim 2 so that, with the end milling cutter 21, the entire inner contour of the rim 1, including the rim well 4 and the rim flanges 3, as well as the outer areas of the extreme ends of the rim flanges 3 can be worked without the tool having to be repositioned or even replaced during the operation.

Due to the shape of the end milling cutter 20, the milling cutter can be positioned at the end on the outside of one rim flange and it is then moved by computer control along the first rim flange 3, the inner contour including the rim well 4 and the second rim flange 3, then finally working the outside of the end of the second rim flange.

In the embodiment, a double-edged end milling cutter 20 is used, but it is also possible to use a single-edged end milling cutter or else some other similar tool.

While the end milling cutter 20 is working the welding burr 8, the rim 1 is continuously pivoted by a predefined angular range back and forth around the central axis 6 of the rim so that the rim well 4 is not only worked on the width of the milling cutter head 26 but also an angular range is traversed on the rim.

Through this measure, it is achieved that, even when an end milling cutter having a diameter of just a few millimeters is used, the entire welding burr can be reliably removed over its entire width. Moreover, through this measure, it is ensured that the transition from the worked places to the unworked places is continuous and steady so that no sharp edges but rather only flat transitions are formed as a result of the working with the end milling cutter.

According to the invention, the method can first remove, for example, the welding burr 8 on the outside of the rim 1, while in a subsequent step, the welding burr 8 on the inner contour of the rim is removed with the end milling cutter 20 (or else in the opposite order).

However, it is also possible for the end milling cutter 20 and for the disk milling cutter 10 to remove the welding burr 8 on the rim 1 simultaneously (or partially simultaneously) while the rim is continuously being pivoted back and forth by the predefined angular range. Preferably, the predefined angular range is smaller than ±5° and particularly preferred in the range between 0.1° and 2.5°. The angular range is selected as a function of the rim dimensions and of the tool used.

The simultaneous execution of the two process steps translates into time savings during production.

Through the consecutive working of the welding burr 8 on the rim 1, the operating conditions such as, for example, the speed and the angular range of the pivoting as well as the advancing and rotational speeds of the milling cutter can be selected flexibly.

The disk milling cutter 10 shown in an enlarged depiction in FIGS. 4 and 5 is provided in the embodiment with exchangeable carbide cutting plates 11 that allow a rapid replacement of the cutting plates.

The invention claimed is:

1. A rim, particularly for a bicycle, made from a bar section cut to a prescribed length and bent to form a circle, the ends of the cut length being welded together at a weld seam, comprising:

an inner contour defined by inner surfaces of a rim well and a pair of rim flanges projecting generally normally from said rim well;

a rim base defining an outer contour, said rim base being a surface radially spaced from said rim well;

said rim base having a shallow groove oriented parallel to a rotational axis of said rim along the weld seam; and the shallow groove in the rim base being generally concave as seen from the outer contour.

* * * * *